(12) United States Patent
Kohlndorfer et al.

(10) Patent No.: US 8,678,440 B1
(45) Date of Patent: Mar. 25, 2014

(54) RETRACTOR-LAP PRETENSIONER WITH SINGLE MICRO-GAS GENERATOR

(71) Applicant: Autoliv ASP, Inc., Ogden, UT (US)

(72) Inventors: Kenneth Kohlndorfer, Roseville, MI (US); Chris Koprowicz, Macomb, MI (US); Jon E. Burrow, Ortonville, MI (US); Chad E. Moore, Rochester Hills, MI (US); Bin Wang, Windsor (CA)

(73) Assignee: Autoliv Asp, Inc., Ogden, UT (US)

( * ) Notice: Subject to any disclaimer, the term of this patent is extended or adjusted under 35 U.S.C. 154(b) by 0 days.

(21) Appl. No.: 13/722,367

(22) Filed: Dec. 20, 2012

(51) Int. Cl.
*B60R 22/36* (2006.01)

(52) U.S. Cl.
USPC ...... 280/806; 242/374; 242/375.2; 242/379.1

(58) Field of Classification Search
USPC ............... 280/806, 807; 242/374, 375, 379.1
See application file for complete search history.

(56) References Cited

U.S. PATENT DOCUMENTS

| | | | |
|---|---|---|---|
| 2,771,791 A | 11/1956 | Bachman | |
| 3,199,804 A | 8/1965 | Fontaine | |
| 4,932,603 A * | 6/1990 | Yamanoi et al. | 242/374 |
| 5,172,933 A | 12/1992 | Strasser | |
| 5,222,761 A | 6/1993 | Kaji et al. | |
| 5,222,994 A | 6/1993 | Hamaue | |
| 5,340,059 A | 8/1994 | Kanigowski | |
| 5,482,230 A | 1/1996 | Bird et al. | |
| 5,536,041 A | 7/1996 | Acker et al. | |
| 5,588,608 A | 12/1996 | Imai et al. | |
| 5,899,399 A | 5/1999 | Brown et al. | |
| 6,106,006 A | 8/2000 | Bowers et al. | |
| 6,419,177 B2 | 7/2002 | Stevens | |
| 6,520,443 B2 * | 2/2003 | Stevens | 242/374 |
| 6,708,914 B2 | 3/2004 | Stevens | |
| 7,124,974 B2 * | 10/2006 | Shiotani et al. | 242/374 |
| 7,243,941 B2 | 7/2007 | Charpentier et al. | |
| 7,350,819 B2 | 4/2008 | Stevens et al. | |
| 7,407,184 B2 * | 8/2008 | Stevens et al. | 280/736 |
| 7,424,986 B2 * | 9/2008 | Stevens | 242/374 |
| 7,448,649 B2 | 11/2008 | Dunham et al. | |
| 7,458,136 B2 | 12/2008 | Duteil | |
| 7,594,675 B2 | 9/2009 | Bostrom et al. | |
| 7,600,778 B2 | 10/2009 | Schang et al. | |
| 7,828,350 B2 | 11/2010 | Kiribayashi | |
| 7,911,331 B2 | 3/2011 | Tanabe | |
| 8,226,122 B2 * | 7/2012 | Lane, Jr. | 280/806 |

(Continued)

FOREIGN PATENT DOCUMENTS

| | | |
|---|---|---|
| EP | 0855316 A1 | 11/2003 |
| JP | 2000 033848 | 2/2000 |
| JP | 2003-260992 | 9/2003 |
| JP | 2005-064938 | 3/2005 |

(Continued)

*Primary Examiner* — Toan To

(74) *Attorney, Agent, or Firm* — Brinks Gilson & Lione

(57) ABSTRACT

A dual spool retractor device for seat belts in a motor vehicle including a frame, two spools rotatably mounted to the frame, and a pretensioning system providing pretensioning rotation for both the spools. The spools are pretensioning through the activation of a micro-gas generator. The gas generator can provide gas to a single or a pair of gas cylinders. One or more flexible numbers such as a metal band or cable is used which is coupled to one or both spools via a pulley. Activation of the gas generator forces a piston to move in a manner which exerts tension on the flexible member(s) thereby unwinding the flexible member from the spool pulley and providing pretensioning rotation of the respective belt spool.

27 Claims, 10 Drawing Sheets

(56) References Cited

U.S. PATENT DOCUMENTS

| | | |
|---|---|---|
| 2001/0030254 A1 | 10/2001 | Stevens et al. |
| 2004/0150210 A1* | 8/2004 | Cunningham et al. ........ 280/806 |
| 2005/0017496 A1* | 1/2005 | Stevens et al. ................ 280/806 |
| 2006/0097506 A1 | 5/2006 | Stevens |
| 2006/0208124 A1 | 9/2006 | Barak |
| 2008/0217457 A1 | 9/2008 | Clute |

FOREIGN PATENT DOCUMENTS

| | | |
|---|---|---|
| JP | 2006-319854 | 11/2006 |
| WO | WO 01/56844 A1 | 8/2001 |
| WO | WO 02/079008 A1 | 10/2002 |
| WO | WO 2004/067337 A1 | 8/2004 |
| WO | WO 2009/117008 | 9/2009 |
| WO | WO 2009/152929 A1 | 12/2009 |

* cited by examiner

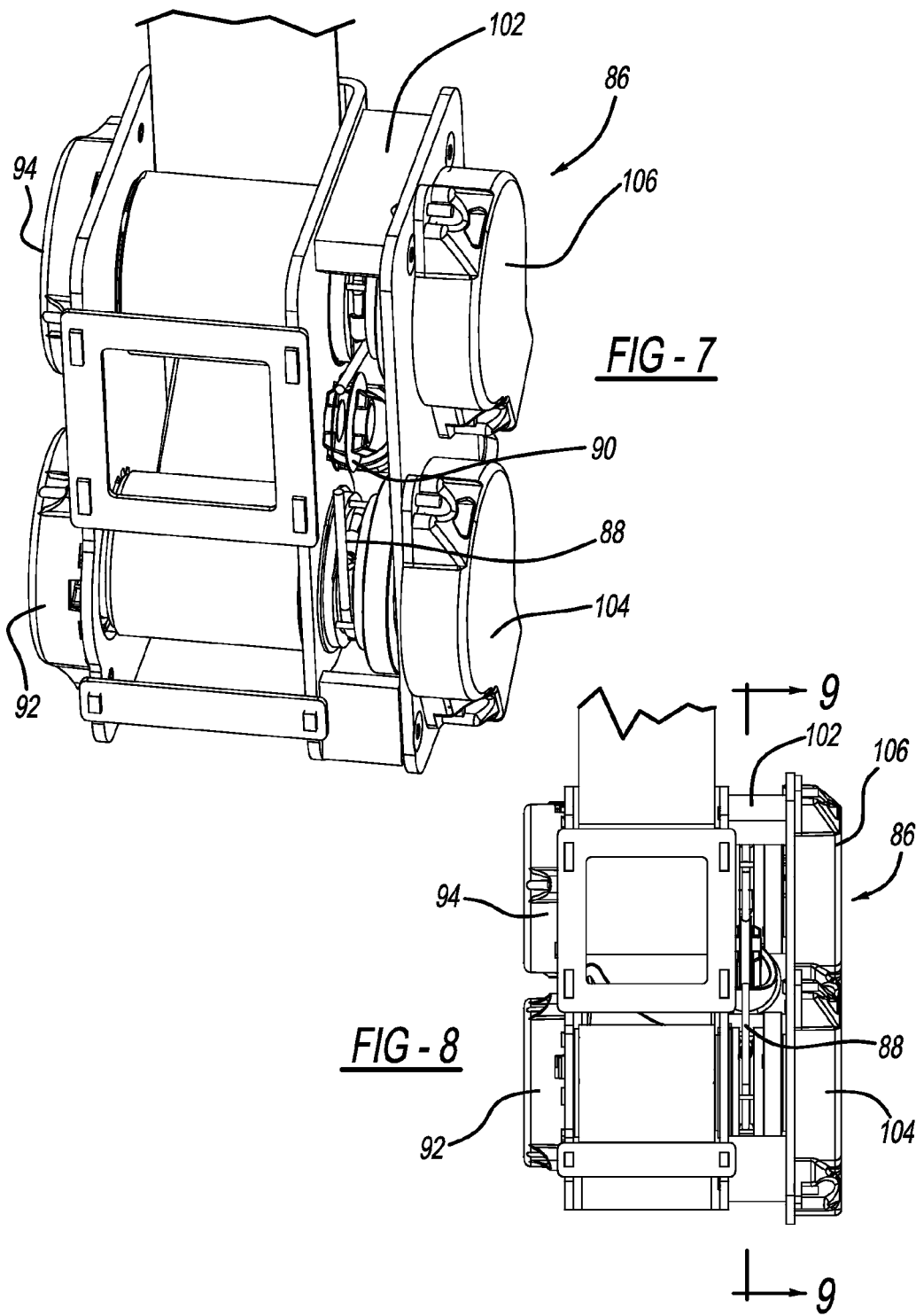

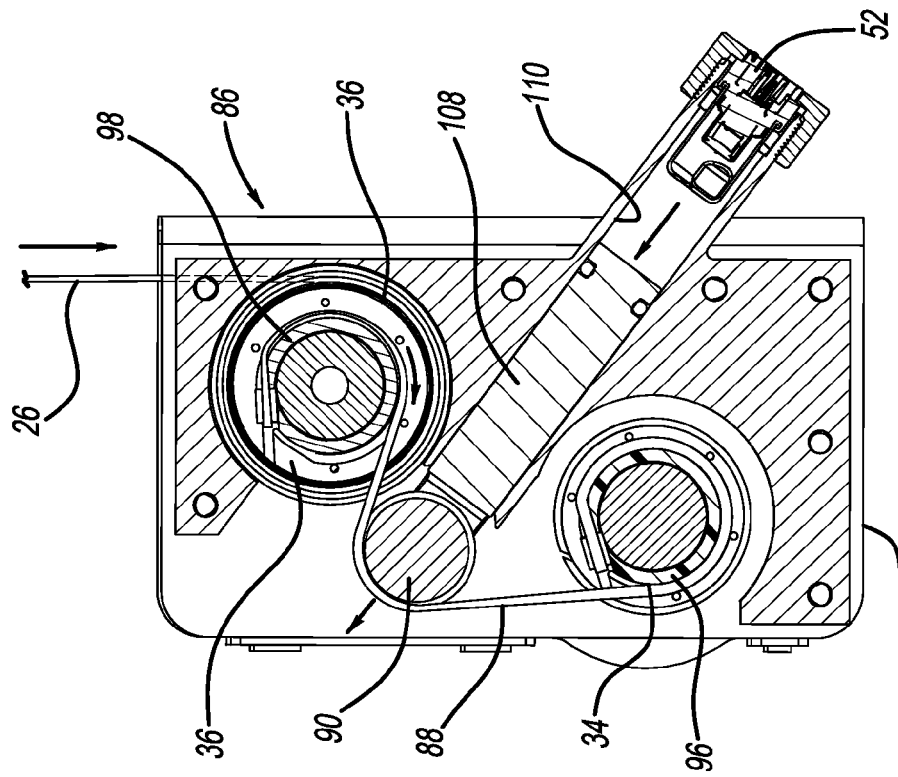
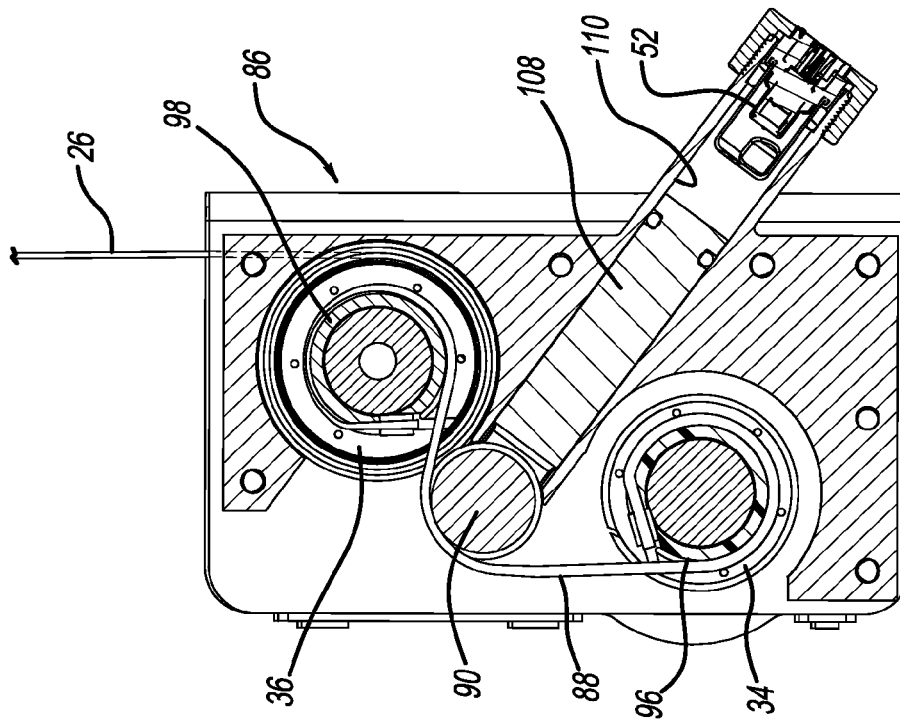

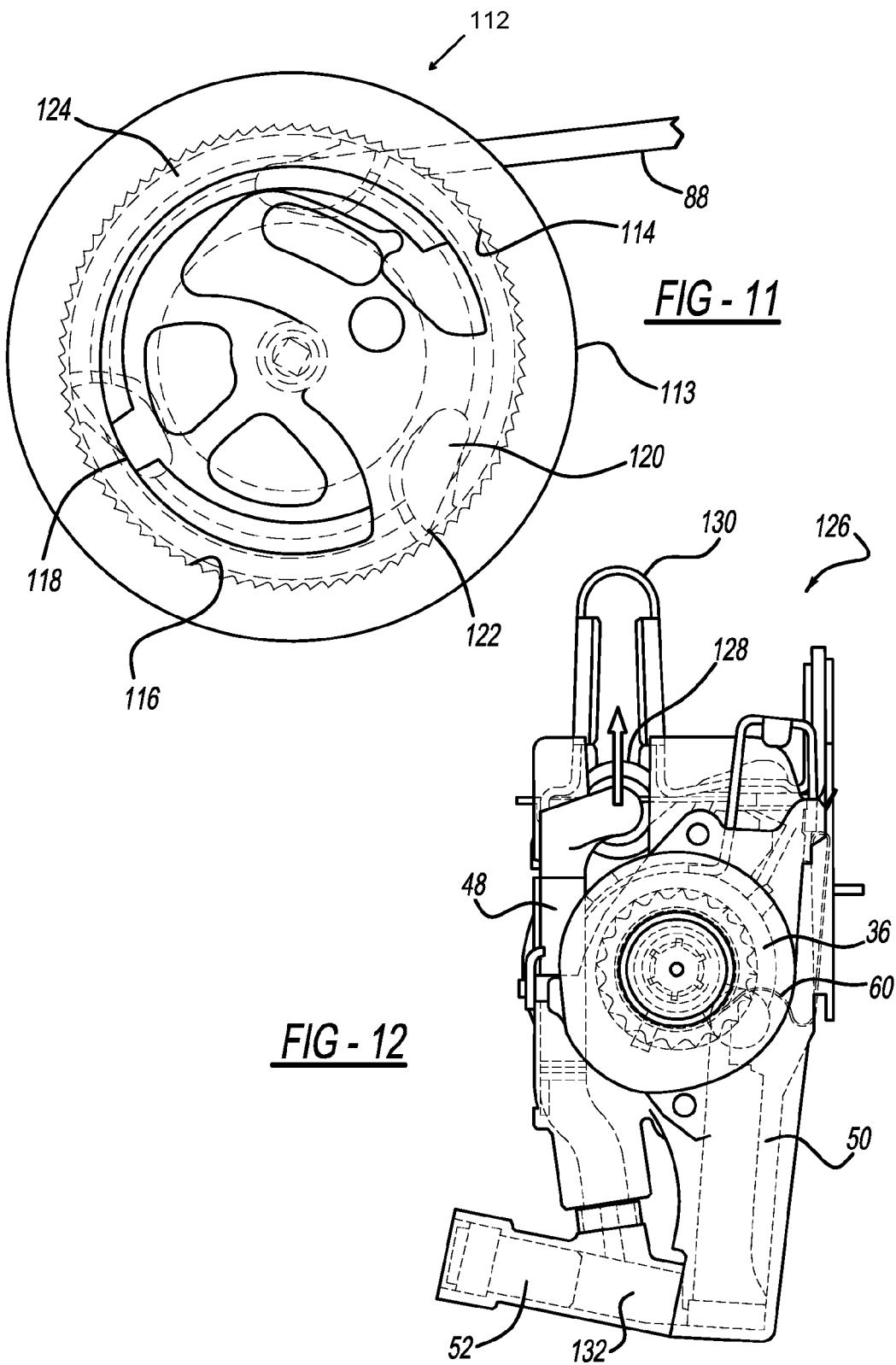

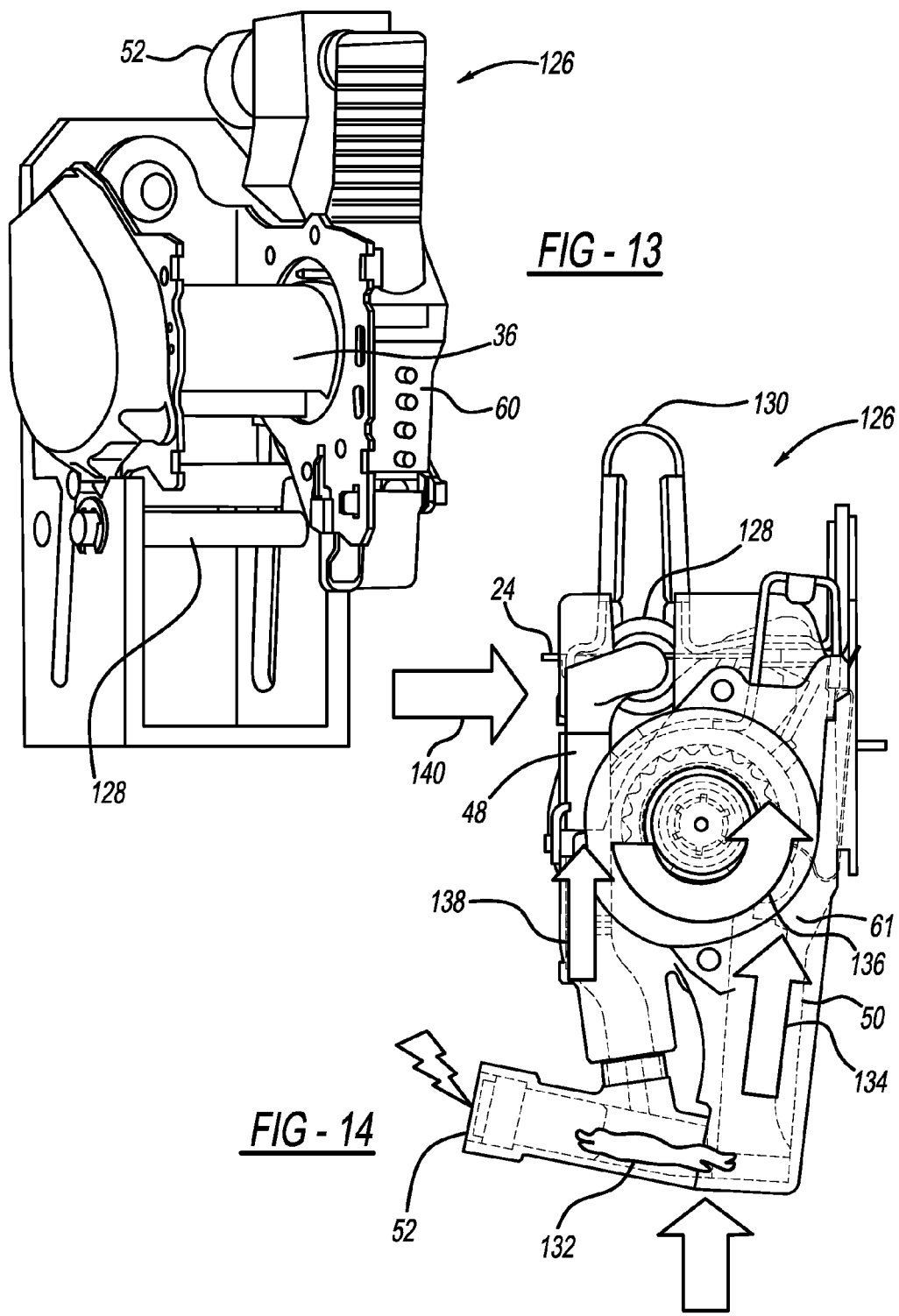

RETRACTOR-LAP PRETENSIONER WITH SINGLE MICRO-GAS GENERATOR

BACKGROUND OF THE INVENTION

1. Field of the Invention

The present invention generally relates to automotive safety restraint systems for motor vehicles. More specifically, the invention relates to an active three-point seat belt system having a retractor incorporating a pretensioning function for two belt sections terminating at the retractor frame.

2. Description of Related Art

Motor vehicle seat belt restraint systems are available in a number of configurations. The most common in modern automobiles is the so-called three point type having a single shoulder belt and a lap belt. This configuration uses either a single continuous length of belt webbing, provided with a single retractor, or separate lap and shoulder belt sections each having their own retractor integrated together or separate.

In the single retractor arrangement, a latch plate slides along the belt. One end of the belt is attached to a first anchor point secured to the vehicle on one side of the seat. The other end is attached to a rotatable spool retractor secured to the vehicle at a second anchor point which, for example, can be on the floor pan, side pillar, or seat structure. To secure an occupant, the belt latch plate is inserted and fastened into a buckle, also fixed to an anchor, and the belt slides through the latch plate as the occupant fastens and unfastens the seat belt.

The dual retractor belt arrangement has two belts each individually attached to the latch plate at one end and secured to a separate retractor spool at the other. In some vehicles with dual retractors, each retractor is remotely mounted, independent of the other. Each retractor spool separately pays out or draws in the lap and shoulder belt webbing as necessary. This configuration is more costly due to the provision of an additional retractor. In addition, assembly and mounting within the vehicle is more complex because each retractor may be independently mounted to the vehicle. However, dual retractors are desirable in some applications to meet performance requirements, and for application in premium vehicles due to the additional comfort and convenience features such systems can provide for the occupants. Some dual retractor systems have two spools carried in a single frame.

A further feature of modern belt restraint systems is the inclusion of a pretensioning system. Pretensioning systems may be activated by a control system that, for example, senses emergency braking or, similar to an airbag deployment system, detects an actual or impending vehicle collision. If the system detects an appropriate event, the pretensioning system causes the retractor spool or spools to quickly draw-in slack from the belts, thereby enabling the restraint system to engage the occupant early in the collision sequence.

In a single belt system, the pretensioning device may be coupled to a single retractor spool. Performance can be enhanced for such systems if a so-called lap pretensioner attached to the lap belt anchorage point linearly retracts webbing from the lap belt while the single retractor also acts on the belt. For dual spool retractor systems, if pretensioning is desired on both spools, the system must have devices coupled to both spools. This is a more complex and costly configuration since the control system must be configured to actuate both devices. One such approach is to use two separate pretensioning systems, each dedicated to act on one of the two retractor spools.

Various designs of belt pretensioners are known. One type, known as a roto-pretensioner, incorporates a series of balls in a gas duct which are driven by the activation of a micro-gas generator to engage with a sprocket to wind the retractor spool to retract the belt. In a dual retractor system, two such roto-pretensioners may be required.

Another type of pretentioner uses an electric motor to drive one or more spools. These pretensioners have added flexibility since the control system may be configured to retract slack or otherwise control the spools in non-emergency situations. For example, the system may be configured to retract the slack in the belts when an occupant exits the vehicle. However, existing electric motor driven retractors require an independent electrical motor for each retractor spool. This results in additional cost and complexity. Due to the rapid response requirements of pretensioning, electric motor driven retractors may also have pryrotechnic pretensioner mechanisms.

Mentioned previously are linear retractors which are pyrotechnically actuated and are usually mounted to a vehicle anchorage point to retract a buckle or guide loop of a belt system. Such systems may act in conjunction with or instead of retractor based pretensioning systems. In an effort to provide greater total pretensioning effects, two (or more) pretensioning systems can be provided to act on a belt system for restraining an occupant.

In addition to the considerations previously mentioned, new US NCAP criteria place increasingly stringent requirements on the performance of belt and passive occupant restraint systems. Including in such requirements are those related to chest deflection and femur loads measured on standardized crash test dummies during crash test studies. Dual spool retractors having pretensioning systems for both spools have been shown to enhance ability to meet these increasingly stringent requirements. When providing such systems, it is desirable to reduce the number of components and the complexity of such systems In view of the above, there exists a need for a seat belt retractor device providing pretensioning functions for two spools or otherwise for two belt sections terminating at the retractor, and provided in a manner which is cost-effective and capable of meeting performance requirements.

BRIEF SUMMARY OF THE INVENTION

In satisfying the above need, as well as overcoming the enumerated drawbacks and other limitations of the related art, embodiments of the present invention provide a dual spool retractor device for seat belts in a motor vehicle comprising a frame, and two retractor spools rotatably mounted to the frame. The spools are each attached to one end of a seat belt section, a pretensioning drive arrangement is provided in which a single micro-gas generator (MGG) can be utilized which is coupled to both spools, providing a pretensioning effect for both spools without duplicating the full mechanisms of a pretensioner for each spool.

In one embodiment of the present invention, the single MGG acts on a piston which, when displaced, pushes a metal band or wire which is in turn wrapped on pulleys of both spools. The system can be used in a typical dual spool system in which the lap and shoulder belt are both fixed to a latch plate. However, the design principles of this invention may also be used in a system using a single length of webbing used with a sliding latch plate. In such an application, the lap belt spool would only be provided for its pretensioning function and not as a traditional retractor to take up a significant length of seat belt webbing. Another variation of the invention uses a single spool for the termination of one belt section, while another belt section terminates at the retractor frame and is acted on by a sliding bar or roller for pretensioning that section. Such systems do not require two spools, but provides pretensioning for two belt segments, and provide this feature with a single micro-gas generator. Several embodiments of systems providing the above noted features are described in this specification and by the appended drawings.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 7 is a pictorial view of a dual spool retractor in accordance with a third embodiment of the present invention;

FIG. 8 is another pictorial view of the retractor shown in FIG. 7;

FIGS. 9A and 9B are cross-sectional views through the retractor shown in FIG. 8 taken along line 9-9;

FIG. 11 is an enlarged view of a spool locking clutch which may be used with various embodiments of the present invention;

FIG. 12 is a side view of a retractor in accordance with a fourth embodiment of the invention;

FIG. 13 pictorial view of the retractor shown in FIG. 12 (shown inverted from the orientation shown in FIGS. 12 and 14); and FIG. 14 is a side view of the retractor shown in FIGS. 12 and 13 showing its operation.

DETAILED DESCRIPTION

Figure 1:
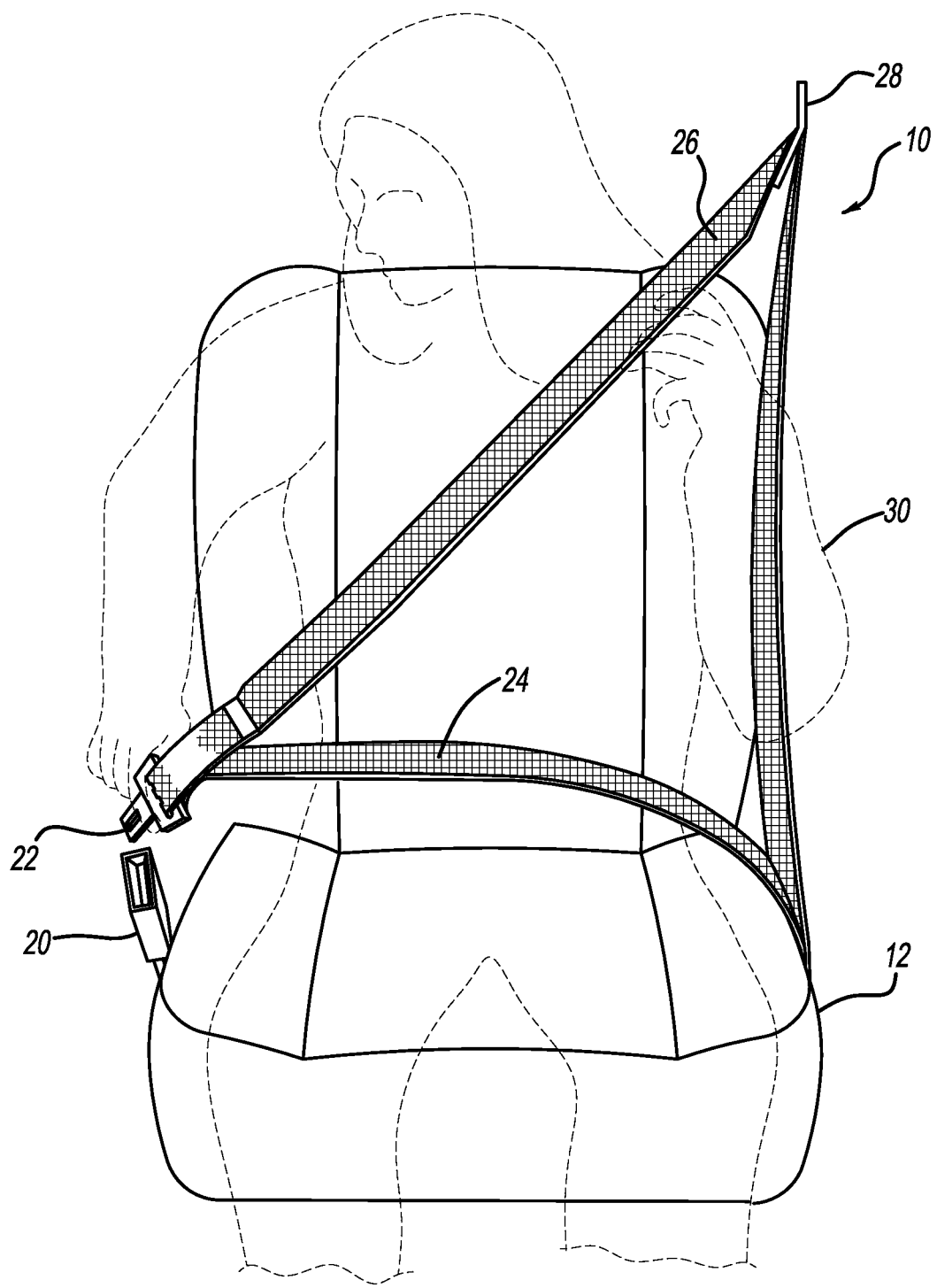
FIG. 1 is a perspective view of a representative seat belt restraint system which may incorporate the retractor features in accordance with this invention.
Figure 2:
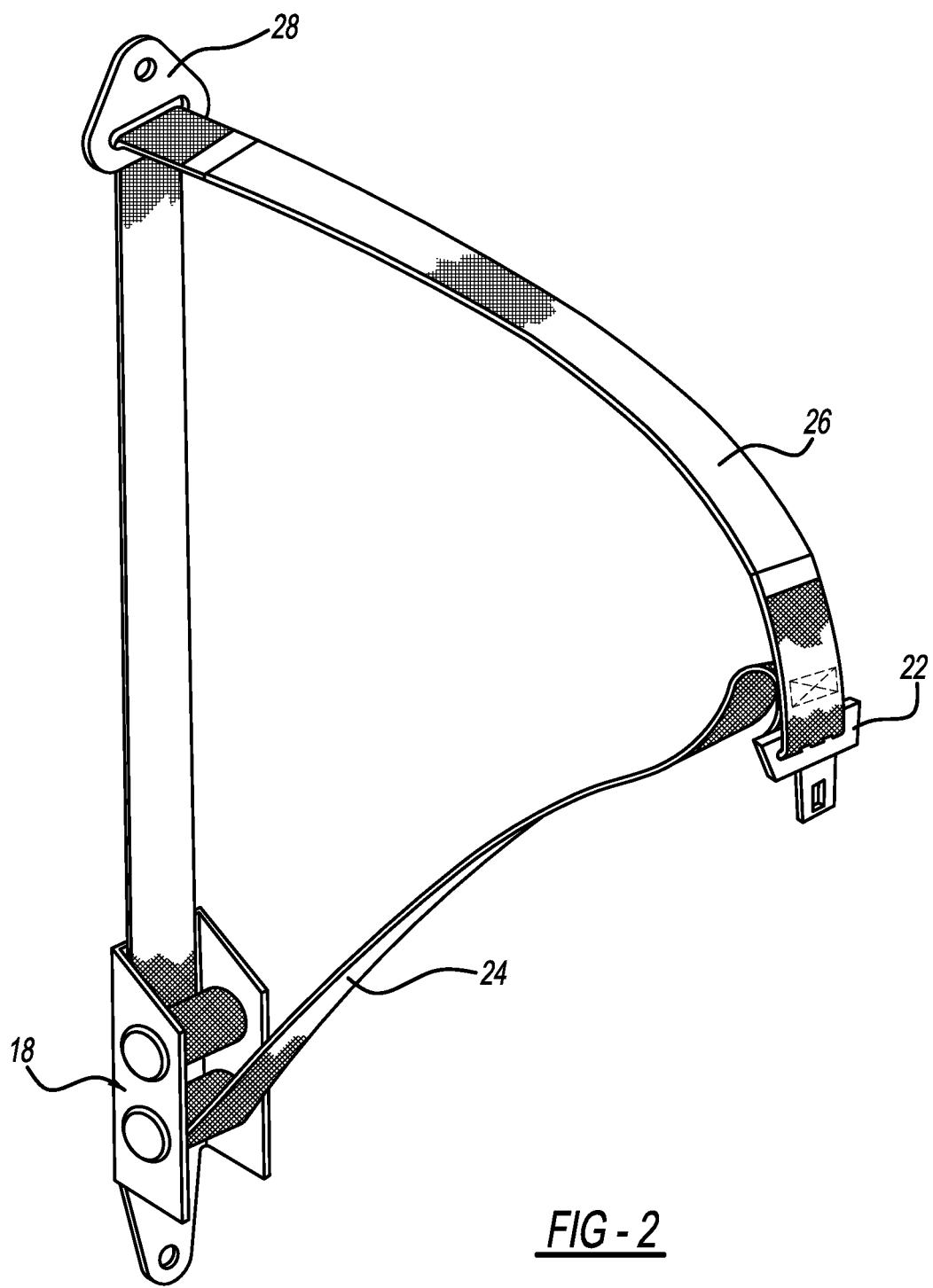
FIG. 2 is a pictorial view of the belt system shown in FIG. 1 and showing a representative dual spool retractor.

Referring now to the drawings, a representative restraint system which may be used with retractors incorporating principles of the present invention is illustrated in FIGS. 1 and 2, and designated at 10. The system 10 is used for a vehicle seat 12 and includes a dual spool retractor 18 (FIG. 2), both mounted to the vehicle body structure. Located relative to seat 12 is a buckle 20, also secured to the body structure, into which a latch plate 22 is inserted and removably secured. Extending between retractor 18 and affixed to latch plate 22 are a lap belt 24 section and a shoulder belt 26 section. The retractor 18 is configured to provide terminations for belt sections 24 and 26.

Again referring to FIG. 1, latch plate 22 is affixed to one end of each of the lap belt section 24 and the shoulder belt 26 section. When the latch plate 22 is released from the buckle 20, some embodiments of the retractor 18 of the present embodiment retracts each of the belt sections 24 and 26. In other embodiments, the retractor 18 provides retraction only for shoulder belt section 26. For all embodiments, retractor 18 provides pretensioning for both belt sections 24 and 26.

Guide loop 28 is usually fixed to a vehicle door pillar (or to the seat 12) in a stationary manner at approximately the shoulder height of an occupant 30. In some systems, the position of the guide loop 28 may be vertically adjustable. Guide loop 28 positions shoulder belt section 26 across the shoulder and chest of seat occupant 30 and re-direct it back into retractor 18.

Figure 3:
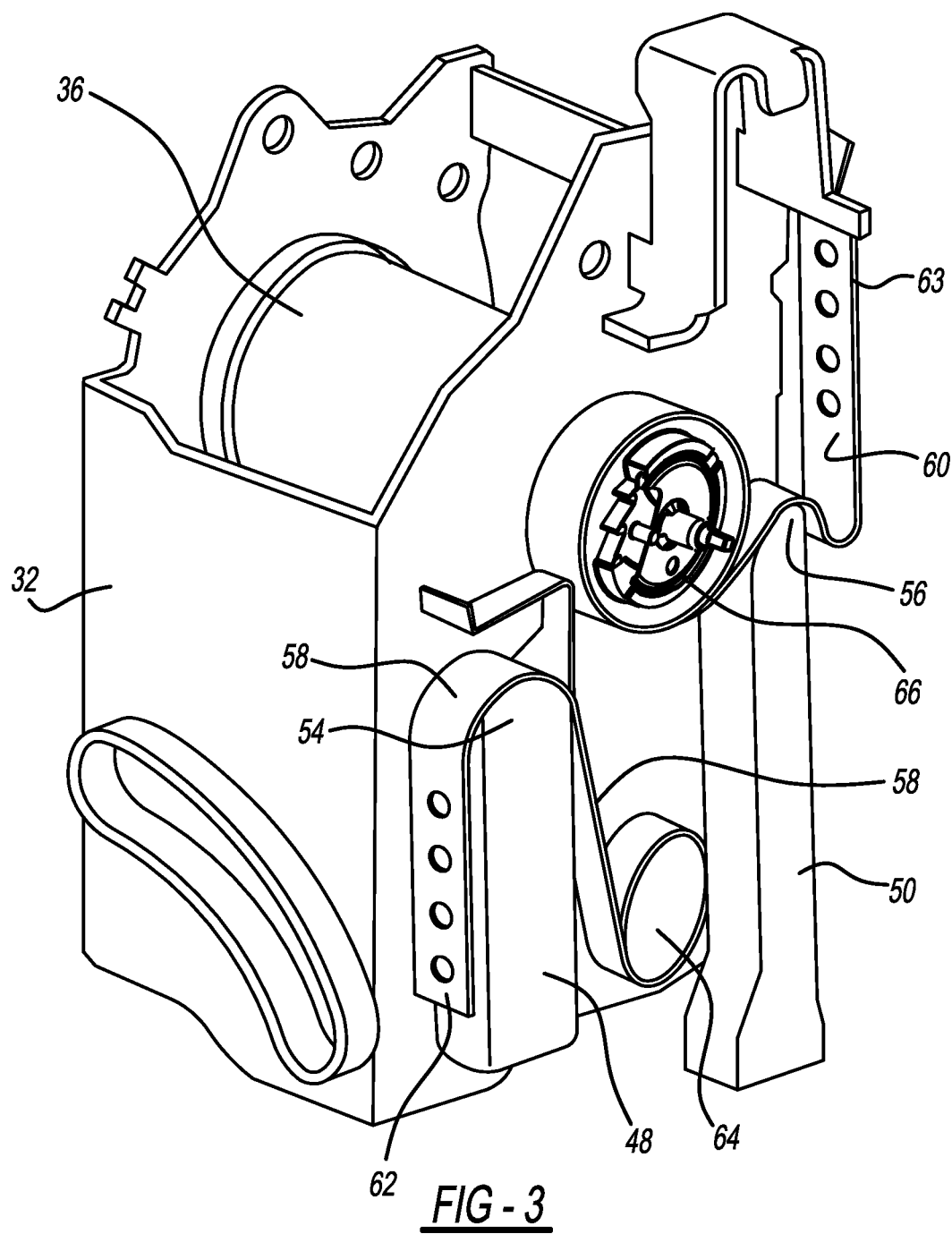
FIG. 3 is a pictorial view of a dual spool retractor in accordance with the first embodiment of the present invention.
Figure 4:
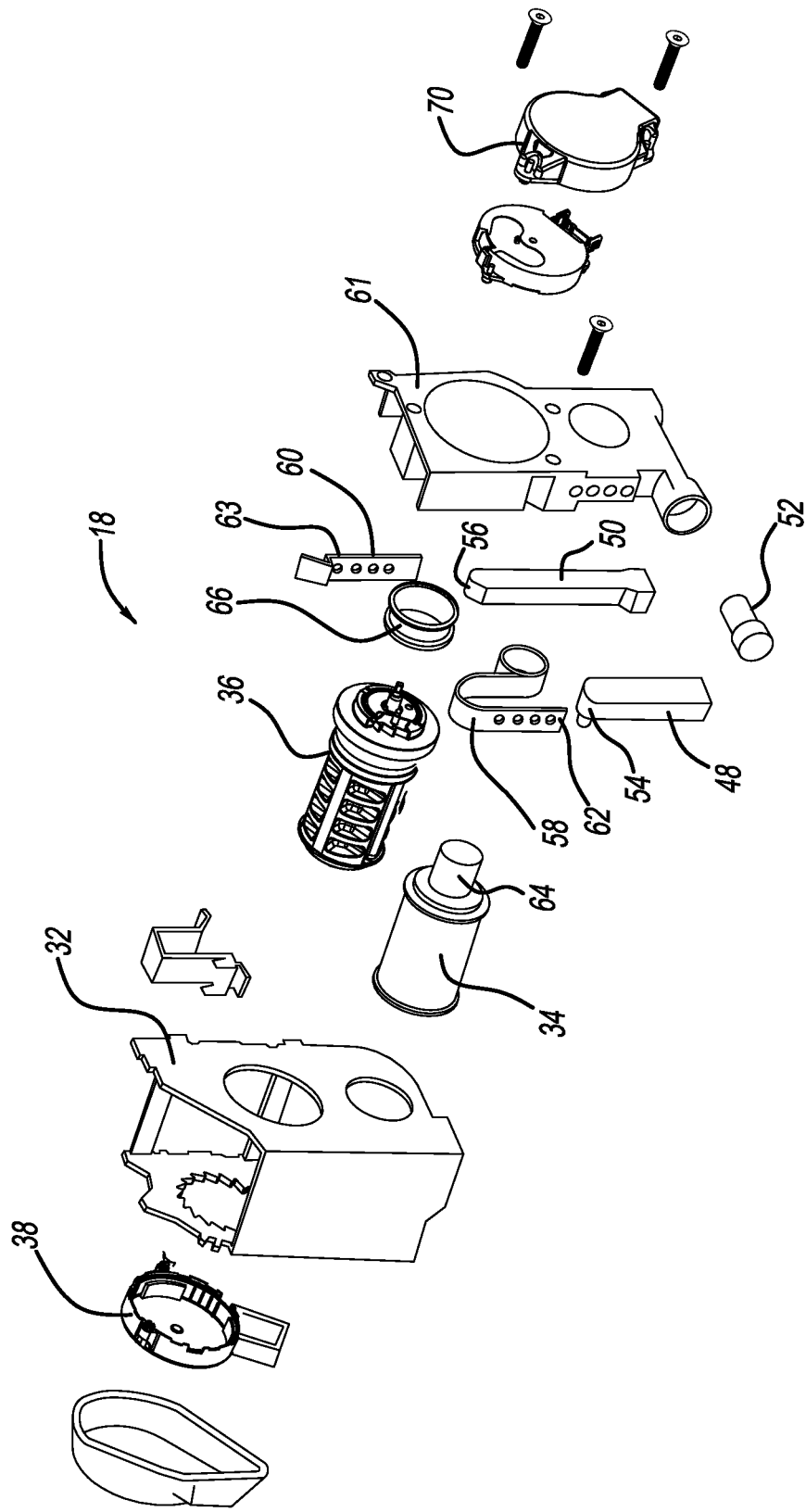
FIG. 4 is an exploded pictorial view of the retractor shown in FIG. 3.

Turning now to FIGS. 3 and 4, dual spool retractor 18 according to a first embodiment of the present invention is shown and includes a frame 32 to which both lap belt spool 34 and shoulder belt spool 36 are rotatably mounted. Retractor 18 further includes elements typically found in modern seatbelt retractors including a rewind spring for each of the spools acting on the spools for retracting webbing (only one rewind spring assembly 38 is shown). Retractor 18 may further include various other elements not directed to the present invention including belt load limiting features, inertial sensors for emergency locking retractor (ELR) function, mechanisms for providing enhanced comfort and convenience, sensors, and systems for operating in automatic locking retractor (ALR) mode. Retractor 18 includes a pretensioning function which is described in more detail as follows. Retractor 18 has lap belt spool 34 which is mounted underneath shoulder belt spool 36. It should be noted that this order of the spools can be reversed and the spools can be provided in different orientations such as side-by-side or diagonally displaced, depending on design requirements and packaging constraints.

Retractor 18 provides a pretensioning function which serves to reduce slack in both lap belt and shoulder belt sections 24 and 26 by rotating spools 34 and 36 in a direction to retract the belt sections. The advantages and features of the pretensioning function are well known. Retractor 18 includes pretensioning actuators in the form of a first and second cylinders 44 and 46 which are formed by cavities (not shown) in housing 61, having a linearly stroking piston 48 and 50, respectively in their interiors. Housing 61 is removed in FIG. 3 for clarity but is shown in FIG. 4. A micro-gas generator (MGG) 52 is provided to generate actuation gas which is conducted to both cylinders 46 and 48 via passages within housings 61. When an appropriate activation signal is provided, MGG 52 activates to force pistons 48 and 50 to move from the positions shown in FIG. 3 to displaced positions (upwardly from their position shown in FIGS. 3 and 4). Pistons 48 and 50 include a smooth nose end 54 and 56, respectively which are provided for acting on pretensioning bands 58 and 60. Pretensioning band 58 has one end 62 staked to be fixed inside housing 61 adjacent to cylinder 44. Band 58 wraps over piston end 54 and is wound preferably several times on pulley spool 64 where its other end is fixed. In a similar manner, band 60 is also staked at end 63 to housing 61 adjacent cylinder 46 and wraps over piston end 56. Band 60 is wound on spool pulley 66 where its other end is fixed (a portion of the band 60 is cutaway in FIG. 4).

FIG. 4 shows additional components of retractor 18 including side spool control housing 70, which may incorporate an inertia sensing mechanism for providing emergency locking retractor (ELR) functions. It is preferable after a pretensioning displacement occurs to lock a lap belt spool to prevent extraction after pretensioning occurs. For this purpose retractor 18 may incorporate one-way clutch features well known in the art.

Once an activation signal is provided and MGG 52 is activated, gas flowing into cylinders 44 and 46 act on pistons 48 and 52, causing the pistons to extend from their respective cylinders. Piston ends 54 and 56 push on the associated bands 58 and 62, causing spools 34 and 36 to retract seat belt webbing as the bands are pulled off spool pulleys 64 and 66.

Retractor 18 provides a pretensioning function for both the lap and shoulder belt sections 24 and 26 using only a single MGG 52 with its dedicated firing line (not shown). Advantages in costs, complexity and packaging space are provided by implementing a single MGG 52. Since gas pressure is used to activate the pretensioning functions, in the event that one or both of the spools 34 and 36 encounter resistance to retraction motion, pretentioning retraction of the other spool is not affected. Thus pretensioning motion of the two spools is decoupled and a block of one the two spools rotation does not prevent the other spool from undergoing pretensioning rotation.

Dual spool retractor 18 may be used in the place of traditional dual spool retractors in which the lap and shoulder belt sections 24 and 26 are fixed to latch plate 22. Alternatively, dual spool retractor 18 may be used in the place of a conventional single spool retractor with the lap belt spool 34 being provided only for providing the pretensioning function. In such application, a sliding latch plate 22 would be provided, and lap belt spool 34 would not be used for extension and retraction of the belt in normal usage, but rather only for providing the pretensioning action discussed previously.

The provision of smooth piston ends 54 and 56 reduces friction during the pretensioning action. It is also possible to use piston ends have rollers on bearings which act on the related steel bands. Due to the routing of bands 58 and 60, twice the displacement of the band end connected to its respective pulley occurs as compared with the displacement of pistons 48 and 50. This contributes to the small packaging space requirements of retractor 18 in accordance with this invention.

Figure 5:
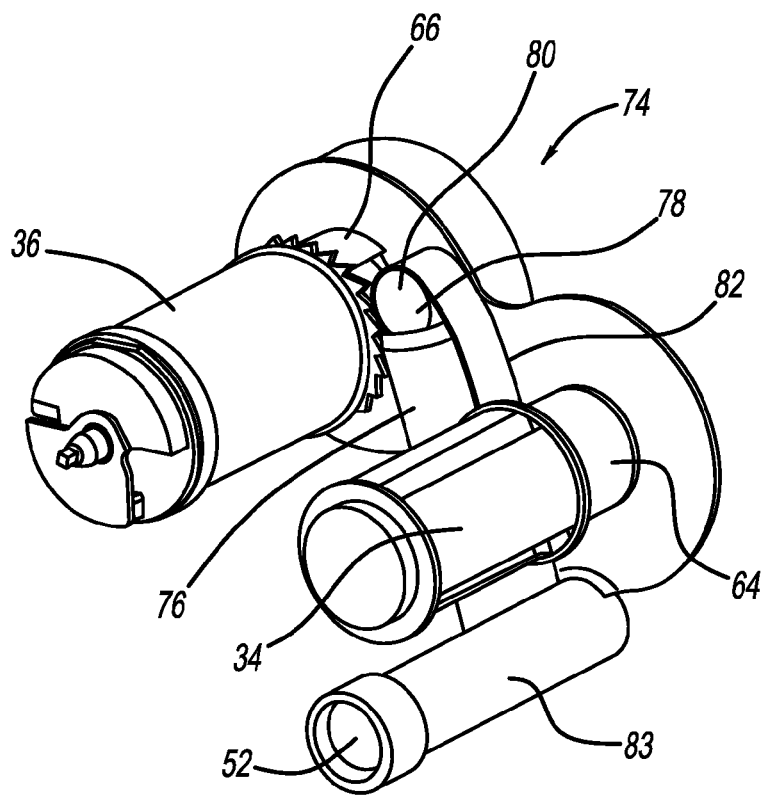
FIG. 5 is a pictorial view of components of a dual spool retractor in accordance with a second embodiment of the present invention.
Figure 6:
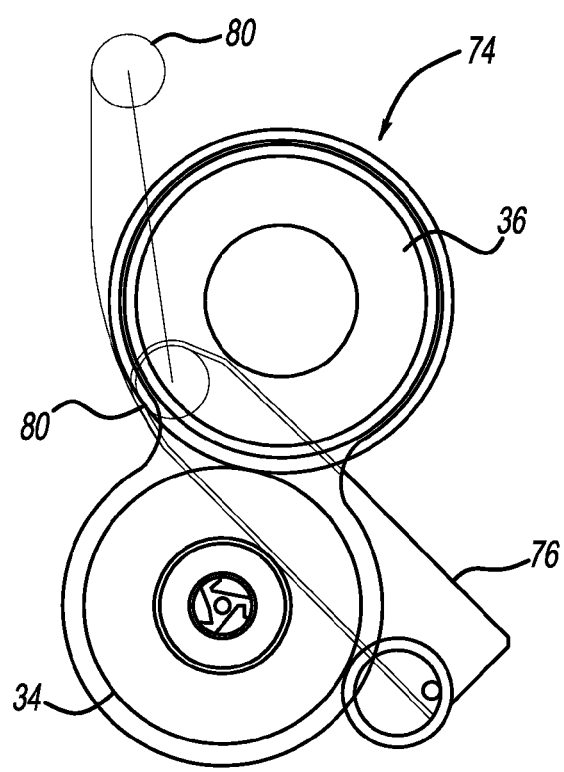
FIG. 6 is a side view of the retractor shown in FIG. 5.
Figure 10:
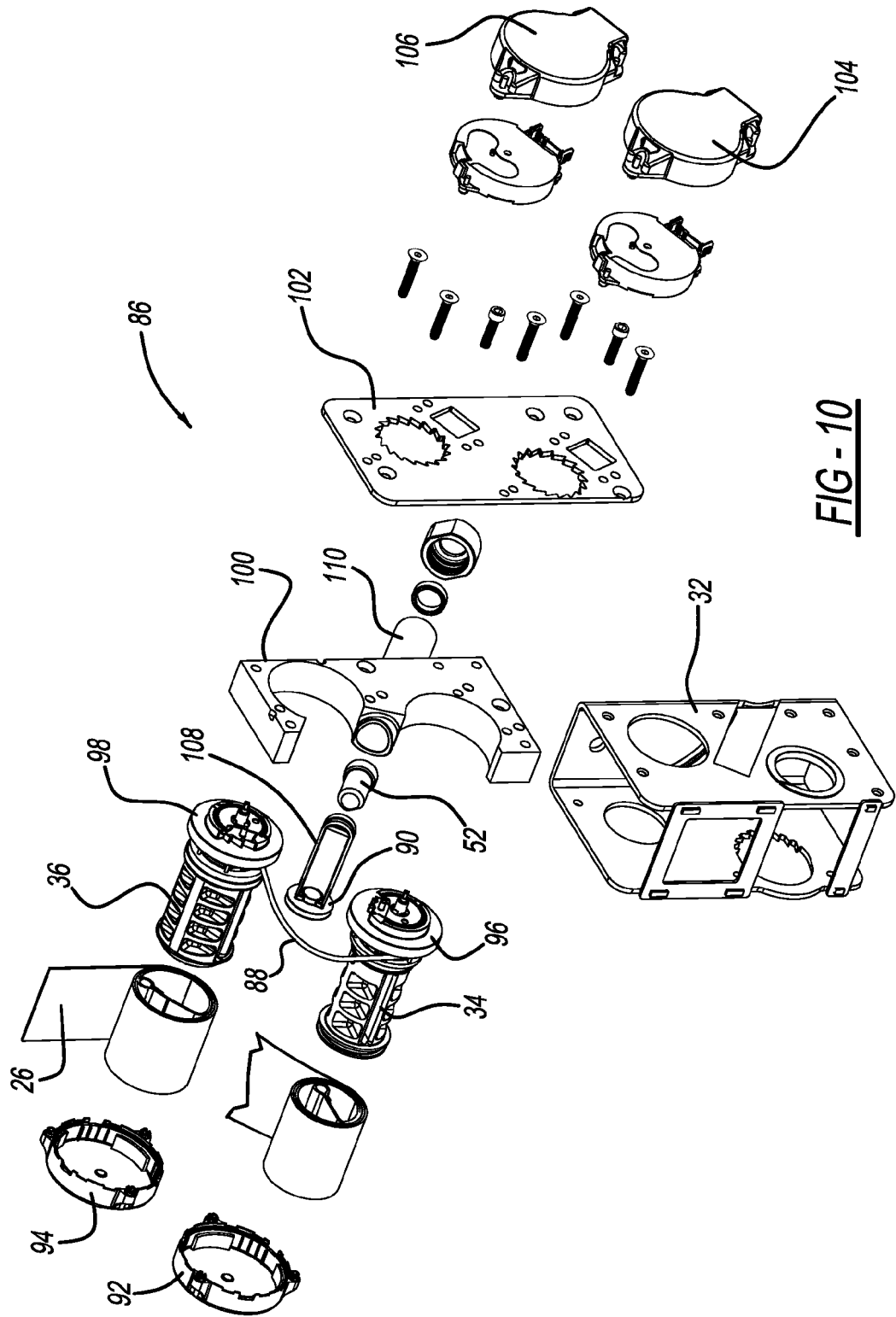
FIG. 10 is an exploded view of the retractor shown in FIGS. 7, 8, 9A and 9B.

Now turning to FIGS. 5 and 6, components of retractor 74 in accordance with a second embodiment of the invention is shown. Elements of retractor 74 which are identical to those described for the first embodiment are identified by like reference numbers as used for retractor 18 and further embodiments described as follows. FIG. 5 provides an illustration of only the critical elements of retractor 74. In this case, a single pretensioner cylinder 76 and piston 78 is provided. Piston 78 preferably features a roller end 80. This embodiment features a single metal band 82 which has one end wrapped around lap belt spool pulley 64 and its other end is wrapped around shoulder belt pulley 66. The piston roller end 80 acts on band 82 between its ends. Gas from MGG 52 is conducted through gas duct 83 to the base of cylinder 76. FIG. 6 illustrates one potential geometry for motion of piston 78 upon its activation. As shown, displacement may be provided along a curved path which aids in reducing packaging space requirements for retractor 74.

Upon actuation, piston roller end 80 acts to unwind metal band 82 from both spool pulleys 64 and 66. If the resistance imposed by both spools 34 and 36 is equivalent, there may be little sliding motion of band 82 relative to roller end 80. However, if a restriction occurs in the retraction motion of one of spools 34 or 36, the metal band 82 will slide along roller end 80, enabling one of the two spools to undergo retraction motion. Thus, as in the first embodiment, imbalances or restrictions in pretensioning retraction of either of the spools do not prevent pretensioning extraction from occurring in the other spool. Retractor 74 provides the advantages of the first embodiment with a further refinement of requiring only the single pretensioning cylinder 76 and piston 78.

Now turning to FIGS. 7, 8, 9A, 9B and 10, retractor 86 is illustrated in accordance with a third embodiment of the present invention. Retractor 86 includes spools 34 and 36 mounted to frame 32. Rewind spring caps 92 and 94 are shown for providing a rewind function. Spool pulleys 96 and 98 are positioned within casting 100 and constrained by end plate 102. Spool control devices including inertia actuators are provided in heads 104 and 106.

Retractor 86 is similar to retractor 74 except that the metal band is replaced by a cable or wire 88. In this case, piston roller end 90 is in the form of a pulley which serves to maintain wire 88 engaged with its grooved perimeter surface. Roller end 90 is affixed to piston 108 movable within cylinder 110. MGG 52 is affixed to the lower end of cylinder 110. Conveniently, cylinder 110 can be formed in whole or in part integrally by casting 100.

FIG. 9A shows the retractor 86 in its normal condition prior to activation of the pretensioning function. FIG. 9B illustrates displacement of piston 108 and end 90 which during actuation, pull on wire 88 which in turn unwraps the wire from spool pulleys 96 and 98 thereby urging the respective spools to undergo pretensioning retraction. This embodiment shares the advantage of the second embodiment in that only a single MGG 52 is required. Force imbalances acting on spools 34 and 36 are accommodated by allowing the wire to move relative to piston end 90.

Now with reference to FIG. 11, a spool locking clutch arrangement 112 is shown. In the prior embodiments of the retractors in accordance with this invention, is generally desirable to lock lap belt spool 34 as well as shoulder belt spool 36 after pretensioning rotation has occurred. The retractor may have multiple clutch functions. Clutches are used in retractors to decouple the pretensioning system from the retractor spool and also as a system lock to allow a tread head 113 to lock the spool to the retractor frame. It is desirable to reduce so-called locking dip which is a momentary delay in locking engagement which can result in a short duration extraction of belt webbing during an impact event. Clutch 112 is an example of one system for providing such locking, and is shown with a cable driven pretensioning system such as that of retractor 86. Lap belt spool 34 has an associated tread head 113 which forms an internal cylindrical section 114 having a series of ramped teeth 116. Hub 118 rotates within tread head 113 and includes a series of pawls 120 (three are shown in phantom lines) which pivot and have end teeth 122 capable of engagement with teeth 116. O-ring 124 acts on pawls 122 and normally biases them to a position of non-engagement with teeth 116. In the normal running operation, pawls 120 are held in their non-engage position by O-ring 124. Pawls 120 may have small pins (not shown) on their backside that O-ring 124 hooks into (not shown) to bias them to their radially inward non-engage position. When MGG 52 is fired, the associated piston pulls on cable 88 which in turn causes clutch hub 118 to rotate. The rapid rotation of the hub 118 causes pawls 122 to overcome the retaining force provided by O-ring 124 such that they rotate outwardly by centrifugal force, causing end teeth 122 to engage with internal teeth 116. The tread head 113 is now rotating along with 34 spool, pretensioning the webbing. Pawl teeth 122 embed themselves into the internal drum 114 which keeps the retractor system locked. Various other clutch mechanisms can be incorporated for maintaining a locked condition for lap belt section 24 and shoulder belt section 26 after pretensioning activation.

Clutch arrangement 112 is described above as a system locking mechanism. The primary function is coupling of the pretensioner to the spindle/treadhead 113, and a secondary function is system locking. Once the pretensioner is fired, this locking becomes the primary locking and the conventional locking system (tread head 113/lock dog etc) functions as a back up. The advantage of the described system is that this will eliminate or reduce locking dip so to improve occupant coupling (reduce webbing payout).

A retractor in accordance with a fourth embodiment of the invention is illustrated in FIGS. 12 to 14 is generally designated by reference number 126. Retractor 126 differs from the retractors described previously in that lap belt section 24 is not connected with a spool and is pretensioned in a different manner described as follows. Retractor 126 includes shoulder belt spool 36 which is pretensioning in a manner consistent with that shown for retractor 18. Like that retractor, shoulder belt spool 36 is caused to undergo pretensioning rotation by the motion of piston 50 which acts on pretensioning band 60 which is wrapped around spool pulley 66. Lap belt piston 48 does not act on a flexible band or wire for pretentioning lap belt section 24. Instead piston 48 drives roller 128 to move within cage 130. Lap belt section 24 is routed to wrap over roller 128 and is fixed at its end to the retractor frame. Activation gas is plumbed through cavity 132 to act on both pistons 48 and 50. In the prior embodiments lap belt section 24 is attached to the respective retractor through lap belt spool 34. In this case, lap belt section 24 is affixed directly to the frame of retractor 24 but is caused to undergo pretensioning retraction through linear motion of roller 128. Due to the belt routing, twice the pretensioning retraction occurs as compared with the displacement of roller 128.

Now with reference to FIG. 14, operation of retractor 126 is illustrated. Upon firing of MGG 52, gases flow under pressure into cavity 132. As designated by arrow 134 shoulder belt piston 50 is moved which results in rotation of shoulder belt spool as designated by arrow 136. Simultaneously, pressure acts on lap belt piston 48 as designated by arrow 138, which causes roller 128 to move from the position shown in FIG. 14 to an upward displaced position limited by the extent of cage 130. Since lap belt section 24 is wrapped over roller 128, the stroking of piston 48 causes pretensioning retraction to occur for the lap belt section 24, designated by arrow 140. Like prior embodiments, retractor 126 provides simultaneous pretensioning action for both lap and shoulder belt sections 24 and 26 using a single MGG 52 and its associated control and firing line system.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A seat belt retractor assembly for a motor vehicle occupant restraint system of a motor vehicle of the type having a shoulder belt section, a lap belt section, and a latch plate between the lap and shoulder belt sections engageable with a buckle, the assembly comprising:
   a retractor frame adapted to be mounted to the motor vehicle,
   a shoulder belt spool affixed to the frame for rotation and connected with the shoulder belt section, the shoulder belt section wound on the shoulder belt spool for stowing and paying out the shoulder belt section,
   a lap belt attachment affixed to the frame and connected with the lap belt section, and
   a lap belt pretensioner actuator and a shoulder belt pretensioner actuator with a single gas source generating an activation gas communicating with both actuators, the lap belt pretensioner actuator coupled with the lap belt section for pretensioning the lap belt section and the shoulder belt pretensioner actuator coupled with the shoulder belt spool for winding the shoulder belt spool for pretensioning the shoulder belt section, a cylinder with a piston acting on a flexible member, coupled with at least one of the lap belt pretensioner actuator and the shoulder belt pretensioner actuator and driven by the piston and the flexible member.

2. The seat belt retractor in accordance with claim 1 further comprising, the piston acting on the flexible member wrapped upon a pulley coupled with the shoulder belt spool, wherein upon actuation motion of the piston, the piston acts on the flexible member to unwind the flexible member from the pulley causing the spool to undergo pretensioning rotation.

3. The seat belt retractor in accordance with claim 1 further comprising, the flexible member in the form of a metal band.

4. The seat belt retractor in accordance with claim 1 further comprising, the flexible member in the form of a cable.

5. The seat belt retractor in accordance with claim 1 further comprising, the single gas source supplying the activation gas to a first and a second cylinder, the cylinders having therein first and second pistons respectively, the first cylinder comprising a part of the lap belt pretensioner actuator and the second cylinder comprising a part of the shoulder belt pretensioner actuator.

6. The seat belt retractor in accordance with claim 5 further comprising, at least one of the first and second pistons acting on the flexible member wrapped upon a pulley coupled with the shoulder belt spool, wherein upon actuation motion of the at least one of the pistons, the at least one of the pistons acts on the flexible member to unwind the flexible member from the pulley causing the shoulder belt spool to undergo pretensioning rotation.

7. The seat belt retractor in accordance with claim 5 further comprising, the first piston acting on a first flexible member wrapped upon a first pulley coupled with the lap belt spool wherein upon actuation motion of the first piston, the first piston acts on the first flexible member to unwind the first flexible member from the first pulley causing the lap belt spool to undergo pretensioning rotation, and the second piston acting on a second flexible member wrapped upon a second pulley coupled with the shoulder belt spool wherein upon actuation motion of the second piston, the second piston acts on the second flexible member to unwind the second flexible member from the second pulley causing the shoulder belt spool to undergo pretensioning rotation.

8. The seat belt retractor in accordance with claim 7 further comprising the first and second pistons having first and second ends respectively engageable with the respective first and second flexible member allowing the respective flexible member to slide relative to the respective piston end.

9. The seat belt retractor in accordance with claim 5 further comprising the second piston having a second end engageable with the flexible member allowing the flexible member to act on the shoulder belt spool and the first piston acting on a roller which acts on the lap belt section wherein movement of the first piston and roller causes retraction motion of lap belt section.

10. The seat belt retractor in accordance with claim 1 further comprising, the piston acting on the flexible member coupled with both a lap belt spool pulley driving the lap belt spool and coupled with a shoulder belt spool pulley driving the shoulder belt spool, the flexible member affixed at opposing ends to a respective lap belt spool pulley and a shoulder belt spool pulley.

11. The seat belt retractor in accordance with claim 10 further comprising, the flexible member in the form of a metal band.

12. The seat belt retractor in accordance with claim 10 further comprising, the flexible member in the form of a cable.

13. The seat belt retractor in accordance with claim 1 further comprising a clutch which couples at least one of the pretensioner actuators to the retractor frame after actuation.

14. A seat belt retractor assembly for a motor vehicle occupant restraint system of a motor vehicle of the type having a shoulder belt section, a lap belt section, and a latch plate between the lap and shoulder belt sections engageable with a buckle, the assembly comprising:
   a retractor frame adapted to be mounted to the motor vehicle,
   a shoulder belt spool affixed to the frame for rotation and connected with the shoulder belt section, the shoulder belt section wound on the shoulder belt spool for stowing and paying out the shoulder belt section,
   a lap belt spool affixed to the frame and connected with the lap belt section, the lap belt section wound on the lap belt spool for stowing and paying out the lap belt section, and
   a first cylinder and first piston, the first piston acting on a first flexible member wrapped on a lap belt pulley,
   a second cylinder and second piston, the second piston acting on a second flexible member wrapped on a shoulder belt pulley, and
   a single gas generator communicating with the first and second cylinders, wherein upon actuation of the gas generator, the first cylinder acts on the first flexible member to unwrap the first flexible member from the lap belt pulley thereby causing the lap belt spool to undergo pretensioning rotation and the second cylinder acts on the second flexible member to unwrap the second flexible member from the shoulder belt pulley thereby causing the shoulder belt spool to undergo pretensioning rotation.

15. The seat belt retractor in accordance with claim 14 further comprising the second piston having a second end engageable with the flexible member allowing the flexible member to act on the shoulder belt spool and the first piston acting on a roller which acts on the lap belt section wherein movement of the first piston and roller causes retraction motion of lap belt section.

16. The seat belt retractor in accordance with claim 14 further comprising the first and second pistons having respective first and second ends engageable with the respective first and second flexible members allowing the respective first and second flexible members to slide relative to the respective first and second piston end.

17. The seat belt retractor in accordance with claim 16 further comprising the first piston end having a first roller engageable with the first flexible member and the second piston and having a second roller engageable with a second flexible member.

18. The seat belt retractor in accordance with claim 14 further comprising a clutch which couples at least one of the shoulder belt spool and the lap belt spool to the retractor frame following the pretensioning rotation.

19. A seat belt retractor assembly for a motor vehicle occupant restraint system of a motor vehicle of the type having a shoulder belt section, a lap belt section, and a latch plate between the lap and shoulder belt sections engageable with a buckle, the assembly comprising:
   a retractor frame adapted to be mounted to the motor vehicle,
   a shoulder belt spool affixed to the frame for rotation and connected with the shoulder belt section, the shoulder belt section wound on the shoulder belt spool for stowing and paying out the shoulder belt section,
   a lap belt spool affixed to the frame and connected with the lap belt section, the lap belt section wound on the lap belt spool for stowing and paying out the lap belt section, and
   a cylinder and piston, the piston acting on a flexible member wrapped on a lap belt pulley coupled with the lap belt spool and coupled with a shoulder belt pulley coupled with the shoulder belt spool, and
   a single gas generator communicating with the cylinder, wherein upon actuation of the gas generator the cylinder acts on the flexible member to unwrap the flexible member from the lap belt pulley and the shoulder belt pulley, thereby urging the lap belt spool and the shoulder belt spool to undergo pretensioning rotation.

20. The seat belt retractor in accordance with claim 19 further comprising, the flexible member in the form of a cable.

21. The seat belt retractor in accordance with claim 19 further comprising the piston having an end with a roller engageable with the flexible member allowing the flexible member to slide over the roller.

22. The seat belt retractor in accordance with claim 19 further comprising the cylinder and the piston cooperating to cause an end of the piston engageable with the flexible member to undergo a curved path between a normal unextended position and an actuated extended position.

23. The seat belt retractor in accordance with claim 19 further comprising a clutch which couples at least one of the shoulder belt spool and the lap belt spool to the retractor frame following the pretensioning rotation.

24. A seat belt retractor assembly for a motor vehicle occupant restraint system of a motor vehicle of the type having a shoulder belt section, a lap belt section, and a latch plate between the lap and shoulder belt sections engageable with a buckle, the assembly comprising:
   a retractor frame adapted to be mounted to the motor vehicle,
   a shoulder belt spool affixed to the frame for rotation and connected with the shoulder belt section, the shoulder belt section wound on the shoulder belt spool for stowing and paying out the shoulder belt section,
   a lap belt attachment affixed to the frame and connected with the lap belt section,
   a first cylinder and first piston, the first piston acting on the lap belt portion,
   a second cylinder and second piston, the second piston acting on a flexible member wrapped on a shoulder belt pulley, and
   a single gas generator communicating with the first and second cylinders, wherein activation of the gas generator causes the first piston to act on the lap belt causing urging it to undergo pretensioning movement and causing the second piston to act on the flexible member coupled with the shoulder belt spool for winding the shoulder belt spool for pretensioning the shoulder belt section.

25. The seat belt retractor in accordance with claim 24 further comprising the second piston having a second end engageable with the flexible member and the first piston acting on a roller which acts on the lap belt section wherein movement of the first piston and the roller causes retraction motion of lap belt section.

26. The seat belt retractor in accordance with claim 24 further comprising the second piston having a second end engageable with the flexible member in the form of a metal band.

27. The seat belt retractor in accordance with claim 24 further comprising a clutch which couples at least one of the shoulder belt spool and the lap belt spool to the retractor frame following the pretensioning rotation.

\* \* \* \* \*